Patented Feb. 7, 1939

2,146,448

UNITED STATES PATENT OFFICE 2,146,448

ACETYLENE SOLUTION

Norman D. Scott, Sanborn, and Charles Roberts Harris, Niagara Falls, N. Y., assignors to E. I. du Pont de Nemours & Company, Wilmington, Del., a corporation of Delaware No Drawing. Application May 6, 1936, Serial No. 78,174

12 Claims. (Cl. 260—679)

This invention relates to the preparation of acetylene solutions, the recovery of acetylene from gas mixtures by solvent action and similar operations involving the solution of acetylene and polyacetylenes.

A number of liquid organic compounds heretofore have been used and proposed as solvents for acetylene for the recovery of gas from gas mixtures, the storage of acetylene in the form of a solution under pressure and for other purposes. For such uses, the solvent most commonly employed is acetone; this is the best known and heretofore has been the best solvent for most of these uses. Other acetylene solvents which have been proposed are acetonitrile, nitrobenzene, liquid hydrocarbons, chlorinated hydrocarbons, and various polyglycols and their esters. Some of these solvents are said to be superior to acetone for certain specific uses, e. g., because of certain selective solvent action possessed by some of them. However, heretofore there has been no solvent proposed having the universality of use of acetone and which also has a greater solvent action per volume.

An object of the present invention is to provide an improved method for preparing acetylene solutions in processes for the recovery and storage of acetylene. A further object is to provide a novel and improved method for recovering acetylene from gas mixtures, particularly gas mixtures obtained by thermal decomposition of hydrocarbons. Our invention also comprises as novel compositions of matter solutions of acetylene in a new class of acetylene solvents, which solutions contain larger amounts of acetylene per volume of solvent than has been heretofore possible. Other objects will be apparent from the following description.

The above objects are attained in accordance with the present invention by dissolving acetylene in certain organic compounds having dialkylamino and carbonyl groups which are selected from the classes: dialkyl aliphatic acid amides, esters of dialkylamino acids and dialkylamino ketones. These compounds, most of which exist at ordinary temperatures in the form of liquids, have excellent solvent properties for acetylene and also other properties which make them especially useful as acetylene solvents for acetylene recovery and storage, e. g., their relatively high boiling points. As a class these solvents have a solvent power for acetylene which is at least equal to that of acetone; several of these new solvents have a very much better solvent power for acetylene than does acetone. The extraordinary solvent action of these individuals makes them especially useful in processes involving the solution of acetylene. Our new solvents are suitable for the recovery of acetylene from gas mixtures, for preparing solutions of acetylene under pressure for the purpose of storage and shipment, e. g., acetylene cylinders used in oxyacetylene welding, and for other acetylene solvent uses, e. g., in chemical reactions where acetylene undergoes reaction in the form of a solution.

The solvents which we have found to have the above described properties are organic compounds having a carbonyl group and at least one dialkylamino group per molecule, the alkyl groups in the dialkyl amino group containing not more than two carbon atoms each, which compounds exist in the classes: dialkyl formamides, dialkyl acetamides, tetralkyl ureas, tetralkyloxamides, methyl and ethyl esters of dialkyl carbamic acids, methyl and ethyl esters of dialkyl glycins, methyl and ethyl esters of dialkyl oxamic acids, and acetonyl dialkylamines. Examples of the alkylated amides suitable for use in the present invention are dimethyl formamide, diethyl formamide, dimethyl acetamide, diethyl acetamide, tetramethyl urea, dimethyl oxamethane and tetramethyl oxamide. Examples of dialkylated amino acid esters which have excellent solvent action on acetylene are trimethyl carbamate and trimethyl glycin. Examples of dialkyl amino ketones are acetonyl dimethyl amine and acetonyl diethyl amine. We have tested the solubility of acetylene in the above described novel solvents and the results shown in the following table indicate the solvent action of this class of materials on acetylene, as compared with acetone.

| Solvent | B. P. °C. | Temp. °C. of solubility determination | Vols. $C_2H_2$ (N. T. P.) dissolved by 1 vol. solvent at 1 atmosphere total pressure |
|---|---|---|---|
| Dimethyl formamide | 150 | 20<br>25 | 33–37<br>28–32 |
| Diethyl formamide | 174–176 | 21 | 20.6 |
| Dimethyl acetamide | 166 | 20 | 27.8 |
| Tetramethyl urea | 173<br>175–177 | 20 | 29.2 |
| Dimethyl acetonyl amine | 123–125 | 23 | 14.3 |
| Trimethyl carbamate | 129–130 | 23 | 18.5 |
| Trimethyl glycine | 135 | 23 | 15.5 |
| N, N, N', N'-tetramethyl amino amino acetamide | 98–99 (30 mm.) | 23 | 16.4 |
| Dimethyl oxamethane | 235–237 | 24 | 14 |
| Tetramethyl oxamide in dimethyl formamide. 6 g. T. M. O.+4.5 g. D. M. F. (total vol. 10 cc. of solution). | | 26 | 20.2 |
| Acetone | 56.5 | 18<br>25 | 18.1<br>13.1 |

These data were obtained by contacting acetylene with the solvents noted to saturation at the temperatures noted and determining the amount of acetylene dissolved by a standard method. The solubility of acetylene in acetone was determined at the same time and by the same method.

Of the various solvents of the above mentioned class, we prefer to employ dimethyl formamide because of its outstanding solvent action on acetylene which not only is much greater than that of acetone, but also is greater than that of the other solvents of our novel class. Dimethyl formamide is a stable, colorless liquid which boils at 150° C. without decomposition. At around 20° C. it dissolves from 33 to 37 volumes of acetylene at atmospheric pressure. By the employment of pressure, considerably more acetylene may be dissolved in dimethyl formamide; for example, at around 15 atmospheres, more than 375 volumes of acetylene will be absorbed by one volume of dimethyl formamide at a temperature of about 20° C. This solution also possesses other desirable characteristics which are noted herein for the herein described class of acetylene solvents. Because of these properties, dimethyl formamide is excellently well adapted for the recovery of acetylene from gas mixtures and for other uses involving the solution of acetylene.

We have discovered that the herein described class of acetylene solvents have a further unusual characeristic in that the solubility of ethylene therein is extremely low. They also do not dissolve elementary gases such as hydrogen or nitrogen to any appreciable extent. This selective solvent action makes these solvents especially useful in recovering acetylene from gas mixtures containing ethylene, for example, gas mixtures obtained by the thermal decomposition of hydrocarbons.

Certain methods for decomposing hydrocarbons to produce acetylene and other products consist in exposing gaseous or liquid hydrocarbons to the action of the electric arc. The gas mixtures from such processes commonly contain relatively large amounts of hydrogen and ethylene and may contain from 5 to 30% by volume of acetylene. Our novel solvents are especially useful in recovering acetylene from such gas mixtures because of the relatively low solubility of ethylene in these solvents. The following data illustrates the low solubility of ethylene in our novel solvents, taking several individuals as examples.

| Solvent | Volumes of gas dissolved per volume of solvent at 20° C. and 1 atmosphere. | |
| --- | --- | --- |
| | Acetylene | Ethylene |
| | Volumes | Volumes |
| Dimethyl formamide | 34.4 | 1.44 |
| Dimethyl acetamide | 27.8 | 1.51 |
| Tetramethyl urea | 30.5 | 2.2 |
| Tetraethyl urea | 14.8 | 2.0 |

Gas mixtures obtained by thermal decomposition of hydrocarbons, including electric arc methods, commonly contain in addition to acetylene, hydrogen, ethylene and higher hydrocarbons, and considerable amounts of diacetylene and other polyacetylenes. For most purposes for which the recovered acetylene is desired, the presence of the polyacetylenes is disadvantageous and these must be removed. We have found that our novel solvents have a very much greater solvent action on the polyacetylenes than on acetylene itself. By taking advantage of the selective action of these solvents as regards the solution of acetylene, ethylene and polyacetylenes, we are able to efficiently recover substantially pure acetylene from mixtures containing these substances.

In accordance with our method, we first scrub the gas mixture, which may contain polyacetylene, ethylene, acetylene, hydrogen and small amounts of other hydrocarbons such as propylene, butylene and the like, with a limited amount of the solvent in such manner that substantially all of the polyacetylenes are dissolved, while the greater portion of the acetylene present passes through the scrubber undissolved, together with the ethylene and hydrogen. Because of the extremely high solubility of the polyacetylenes in these solvents, it is possible to substantially completely remove them without having to use so much solvent as would dissolve more than a small fraction of the acetylene present. The scrubbed gases then are again scrubbed with a larger quantity of one of our novel solvents, whereby substantially all of the acetylene is brought into solution, while the hydrogen and ethylene pass through undissolved. The solubility of the ethylene being very small, the amounts of ethylene which may become dissolved are practically negligible. The acetylene then may be recovered from its solution by known means, e. g., by heating, reducing the pressure, or both. Either or both of the two scrubbing operations may be carried out at atmospheric pressure or under pressures above one atmosphere, as desired. We prefer to scrub the gases at pressures of 1 to 10 atmospheres.

The recovery of the polyacetylenes from solution is more difficult because when the solutions are heated to the point required for complete evaporation and removal of the polyacetylene, the latter has some tendency to form explosive substances. Therefore, although polyacetylenes can be removed from solutions by merely heating, because of the hazard involved, we prefer to employ other means. We have found that the polyacetylenes, e. g., diacetylene, may readily be removed from the solutions by warming to a relatively low temperature, e. g., 20 to 50° C., and bubbling inert, insoluble gas such as hydrogen or nitrogen through the solution. Alternatively, the gas may be warmed before passing it through the solution. The resulting mixture of acetylene and other gas, e. g., hydrogen, then may be scrubbed with one of our novel solvents as above described or mixed with a crude gas from which acetylene is to be recovered.

The shipment and storage of acetylene in pressure retaining vessels for the various uses of the gas is commonly accomplished by filling or partially filling the container with corn pith, balsa wood or other absorbent, porous material and then introducing into the container a solution of acetylene under pressure. For example, the container may be filled with the absorbent material, the acetylene solvent added and acetylene then forced in under the desired pressure, e. g., 10 to 15 atmospheres. We have found that our herein described novel acetylene solvents, especially dimethyl formamide, are especially well adapted for this method of packaging acetylene under pressure. Because of the greater solvent power, it is possible to introduce more acetylene into a given container at a stated pressure than has heretofore been possible. The high boiling points and high stability of our solvents are of further advantage for this utilization.

Most of our novel solvents are liquids and may be used at ordinary temperatures or other temperatures commonly employed in acetylene solvent operations in the pure state. They also may be employed admixed with other acetylene solvents while dissolved in liquid materials which may or may not have solvent action on acetylene. This method is suitable for employment of a solid material for an acetylene solvent process. For example, tetramethyl oxamide, which is solid at ordinary temperatures, may be dissolved in dimethyl formamide or other of our novel solvents or it may be dissolved in other organic solvents and the resulting solution used as an acetylene solvent.

In addition to the high degree of solvent action and the selective solvent properties of our novel solvents which make them especially useful for the recovery of acetylene and for acetylene storage and similar purposes, these materials have a further advantage in that they have good chemical and thermal stability and have relatively high boiling points. The high boiling characteristic of these solvents enables the use of relatively high temperatures in off-gassing operations to remove acetylene from the solvent by heating and greatly decreases the loss of solvent due to the evaporation in an acetylene recovery plant. The high boiling point of such solvents also is of especial advantage in preparing solutions of acetylene under pressure stored in cylinders or other containers, useful in welding and other uses of acetylene. Because of the low vapor tension of the solvent, e. g., dimethyl formamide, the tendency for solvent vapor to come out with the acetylene when the latter is released from the storage vessel is greatly diminished. This not only assures a pure form of acetylene to the user of such containers, but also decreases the total cost of the solvent since practically all of the solvent remains in the container and may be used over again.

We claim:

1. A process comprising dissolving an acetylenic hydrocarbon selected from the group consisting of acetylene and polyacetylenes in a solvent comprising an organic compound, having a carbonyl group and at least one dialkylamino group in which the alkyl groups contain not more than two carbon atoms each, said compound being selected from the group consisting of dialkyl formamides, dialkyl acetamides, tetralkyl ureas, tetralkyl oxamides, methyl and ethyl esters of dialkyl carbamic acids, and methyl and ethyl esters of dialkyl oxamic acids.

2. A process comprising dissolving acetylene in a solvent comprising an organic compound, having a carbonyl group and at least one dialkylamino group in which the alkyl groups contain not more than two carbon atoms each, said compound being selected from the group consisting of dialkyl formamides, dialkyl acetamides, tetralkyl ureas, tetralkyl oxamides, methyl and ethyl esters of dialkyl carbamic acids, and methyl and ethyl esters of dialkyl oxamic acids.

3. A process comprising dissolving acetylene in a solvent comprising a dialkyl formamide in which the alkyl groups contain not more than two carbon atoms each.

4. A process comprising dissolving acetylene in a solvent comprising dimethyl formamide.

5. A process for recovering acetylene from a gas mixture containing ethylene which comprises contacting said gas mixture with a solvent comprising an organic compound, having a carbonyl group and at least one dialkylamino group in which the alkyl groups contain not more than two carbon atoms each, said compound being selected from the group consisting of dialkyl formamides, dialkyl acetamides, tetralkyl ureas, tetralkyl oxamides, methyl and ethyl esters of dialkyl carbamic acids, and methyl and ethyl esters of dialkyl oxamic acids in such manner as to form a solution of acetylene in said solvent.

6. A process for recovering acetylene from a gas mixture containing ethylene and a polyacetylene which comprises contacting said gas mixture with a solvent comprising an organic compound, having a carbonyl group and at least one dialkylamino group in which the alkyl groups contain not more than two carbon atoms each, said compound being selected from the group consisting of dialkyl formamides, dialkyl acetamides, tetralkyl ureas, tetralkyl oxamides, methyl and ethyl esters of dialkyl carbamic acids, and methyl and ethyl esters of dialkyl oxamic acids in such manner as to dissolve substantially all of the polyacetylene constituents in said mixture, while leaving the major portion of acetylene therein undissolved and thereafter contacting the residual gas with the aforesaid solvent in such manner as to form a solution of acetylene.

7. A composition of matter comprising a solution of acetylene in a solvent comprising an organic compound, having a carbonyl group and at least one dialkylamino group in which the alkyl groups contain not more than two carbon atoms each, said compound being selected from the group consisting of dialkyl formamides, dialkyl acetamides, tetralkyl ureas, tetralkyl oxamides, methyl and ethyl esters of dialkyl carbamic acids, and methyl and ethyl esters of dialkyl oxamic acids.

8. A composition of matter comprising a solution of acetylene in a solvent comprising a dialkyl acetamide in which the alkyl groups contain not more than two carbon atoms each.

9. A composition of matter comprising a solution of acetylene in a solvent comprising dimethyl formamide.

10. A composition of matter comprising a solution of acetylene in a solvent comprising tetramethyl urea.

11. A package comprising a pressure resistant vessel containing a solution of acetylene in a solvent comprising an organic compound, having a carbonyl group and at least one dialkylamino group in which the alkyl groups contain not more than two carbon atoms each, said compound being selected from the group consisting of dialkyl formamides, dialkyl acetamides, tetralkyl ureas, tetralkyl oxamides, methyl and ethyl esters of dialkyl carbamic acids, and methyl and ethyl esters of dialkyl oxamic acids under a pressure greater than one atmosphere.

12. A package comprising a pressure resistant vessel containing absorbent material saturated with a solution of acetylene in a solvent comprising dimethyl formamide under a pressure greater than one atmosphere.

NORMAN D. SCOTT.
CHARLES ROBERTS HARRIS.